H. C. GAMMETER.
FEEDING DEVICE FOR DUPLICATING MACHINES.
APPLICATION FILED NOV. 22, 1909.
1,052,332.
Patented Feb. 4, 1913.
5 SHEETS—SHEET 1.
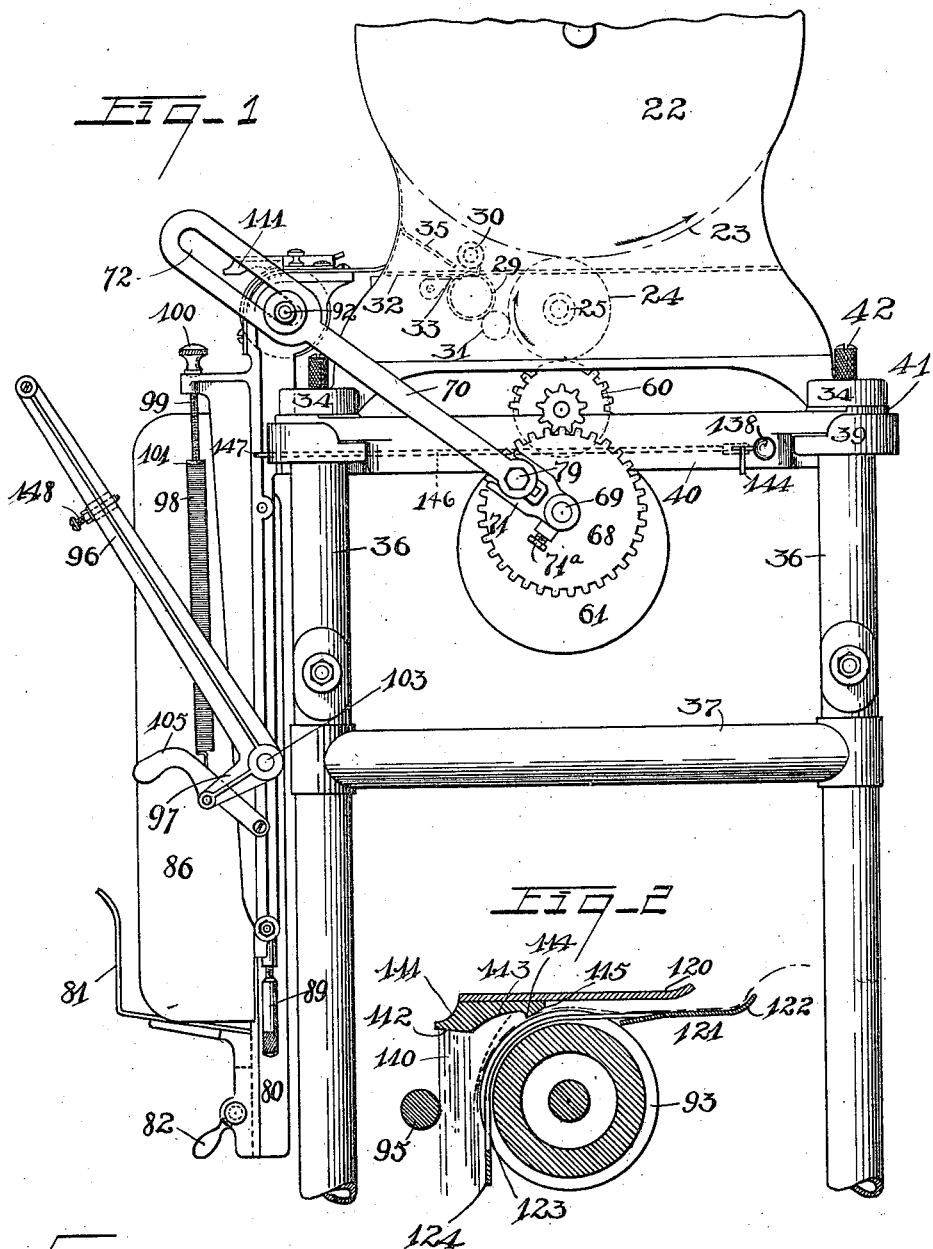

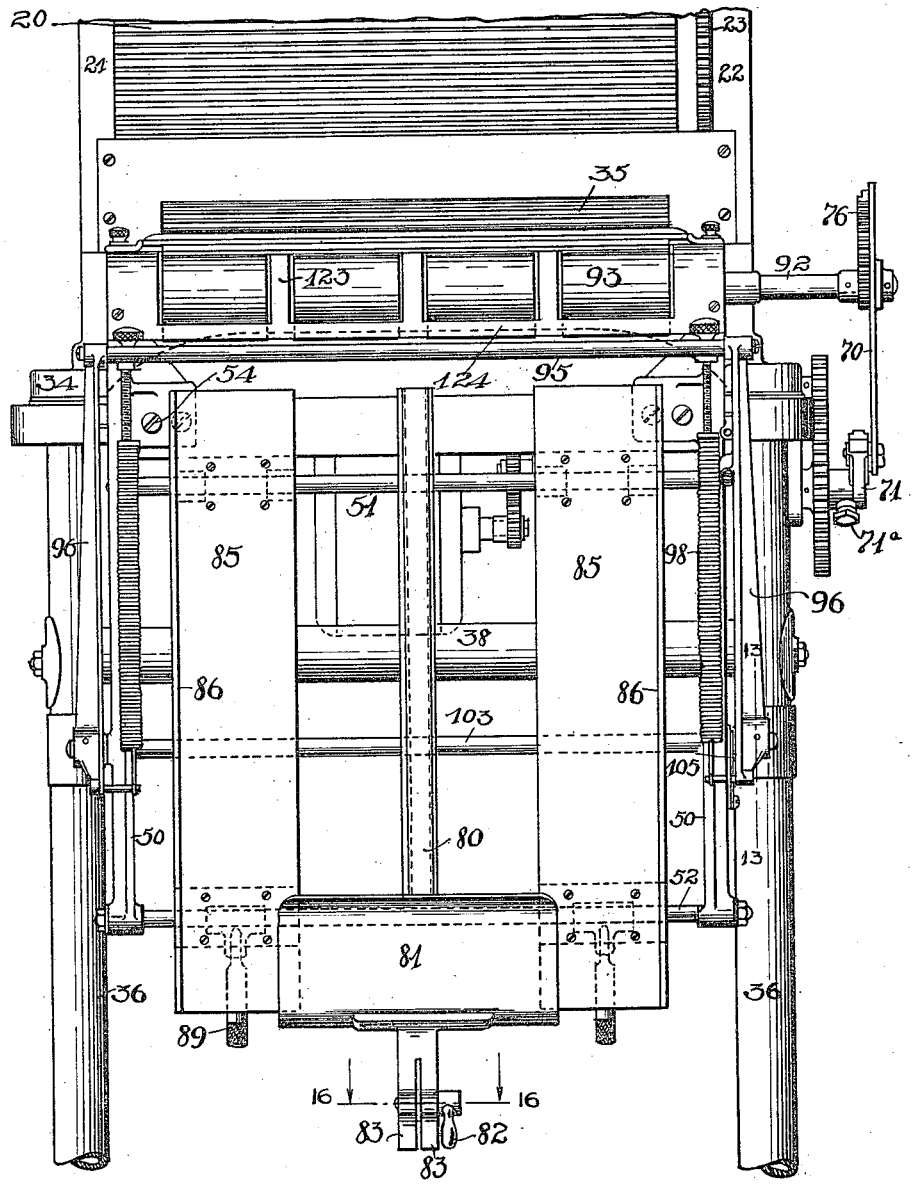

H. C. GAMMETER.
FEEDING DEVICE FOR DUPLICATING MACHINES.
APPLICATION FILED NOV. 22, 1909.

1,052,332.

Patented Feb. 4, 1913.
5 SHEETS—SHEET 3.

Witnesses:
Brennan B. West.
Oliver M. Kappler.

Inventor:
Harry C. Gammeter
By Bates, Fouts & Hull,
Attys

H. C. GAMMETER.
FEEDING DEVICE FOR DUPLICATING MACHINES.
APPLICATION FILED NOV. 22, 1909.
1,052,332.
Patented Feb. 4, 1913.
5 SHEETS—SHEET 4.
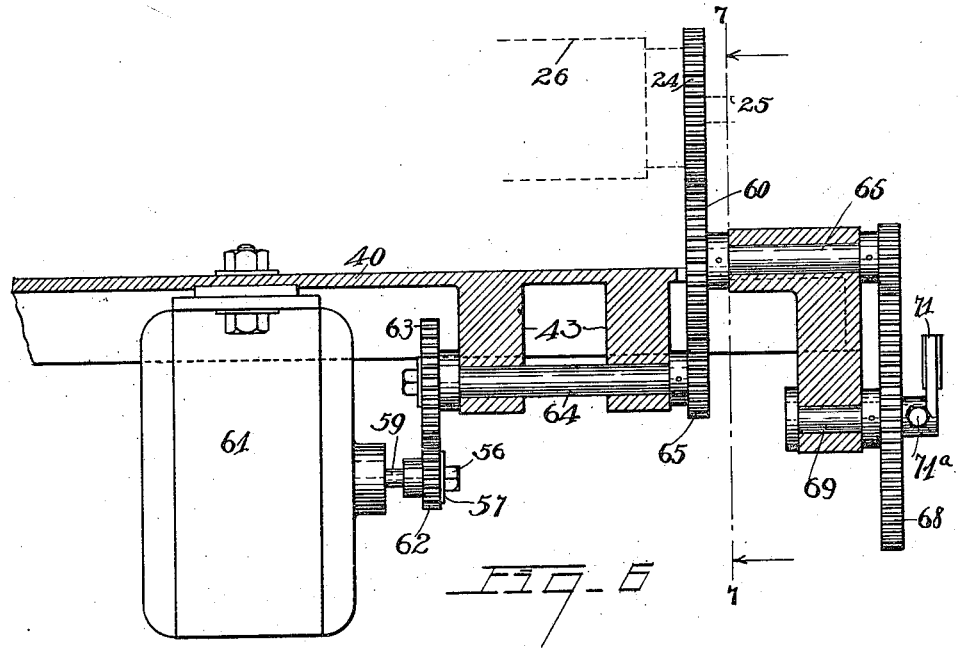
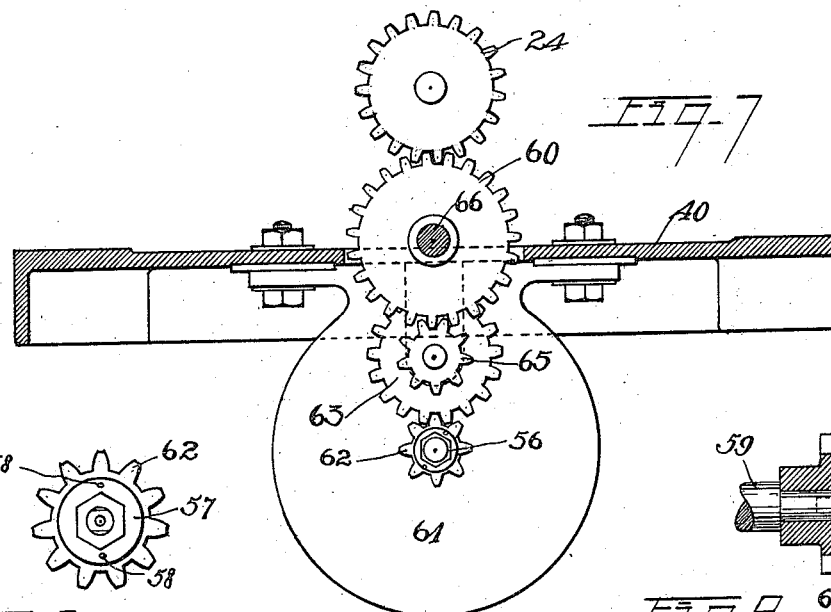
Witnesses:
Brennan B. West
Oliver M. Kappler
Inventor,
Harry C. Gammeter.
By Baker, Jones & Hull
Attys.

H. C. GAMMETER.
FEEDING DEVICE FOR DUPLICATING MACHINES.
APPLICATION FILED NOV. 22, 1909.
1,052,332.
Patented Feb. 4, 1913.
5 SHEETS—SHEET 5.
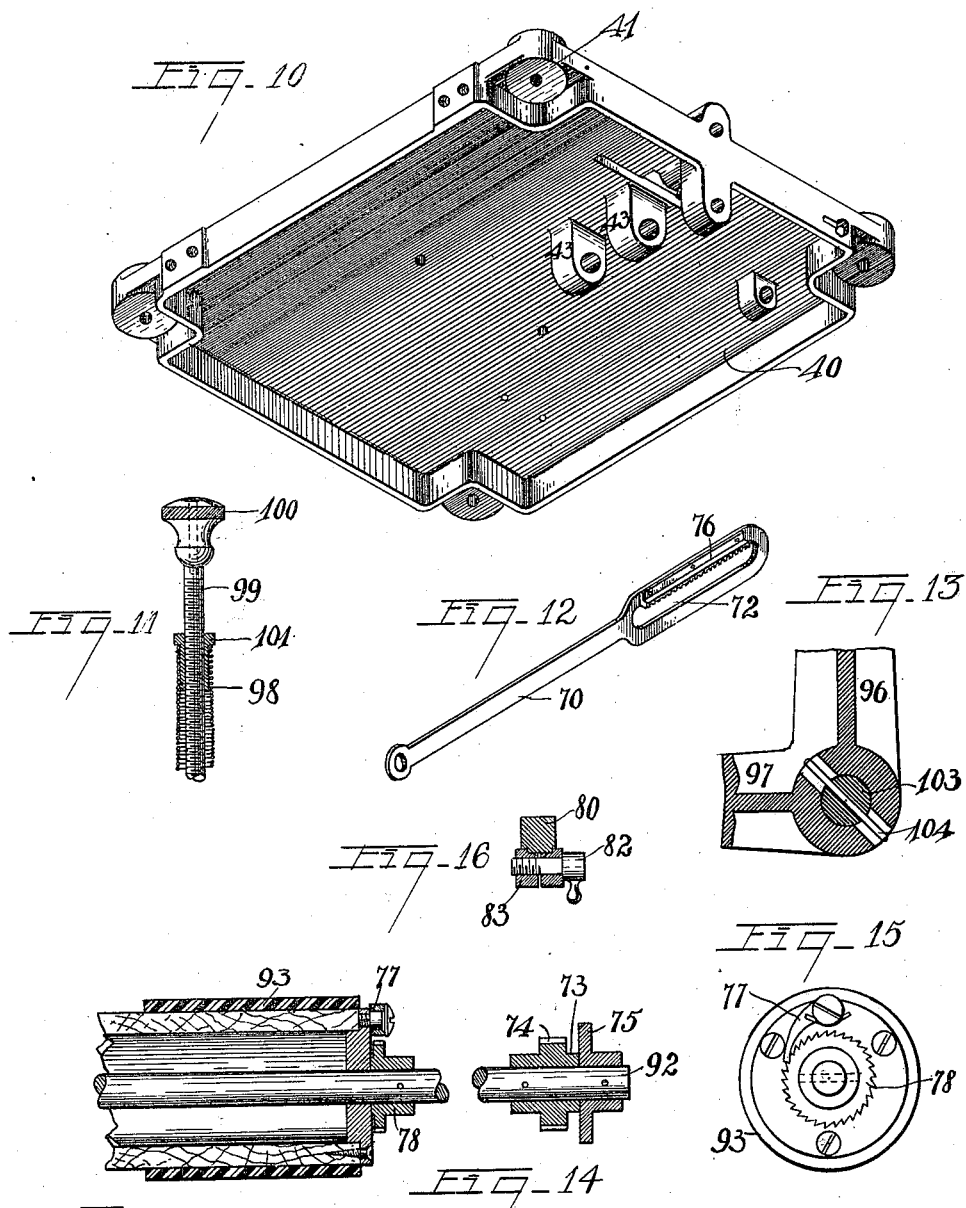

UNITED STATES PATENT OFFICE.

HARRY C. GAMMETER, OF BRATENAHL, OHIO, ASSIGNOR TO THE AMERICAN MULTIGRAPH COMPANY, OF CLEVELAND, OHIO, A CORPORATION OF OHIO.

FEEDING DEVICE FOR DUPLICATING-MACHINES.

1,052,332.  Specification of Letters Patent.  Patented Feb. 4, 1913.

Original application filed September 22, 1908, Serial No. 454,266. Divided and this application filed November 22, 1909. Serial No. 529,495.

*To all whom it may concern:*

Be it known that I, HARRY C. GAMMETER, a citizen of the United States, residing at Bratenahl, in the county of Cuyahoga and State of Ohio, have invented a certain new and useful Improvement in Feeding Devices for Duplicating-Machines, of which the following is a full, clear, and exact description, reference being had to the accompanying drawings.

The object of this invention is to provide a very effective automatic feeding device for feeding paper.

The invention is well adapted for use in conjunction with a printing machine, for example, the rotary duplicating machine of the type known as the multigraph, and comprises an improvement on the structure shown in Patent No. 1,013,308, granted January 2, 1912 to The American Multigraph Company as assignee of Albert D. Pejeau.

The present application is a division of my application #454,266 which shows and claims a combined paper feed and motor drive mechanism.

Present application relates to the paper feeding device proper shown in the application referred to.

For a clearer comprehension of the operation of this invention, it is herein shown in connection with the power drive mechanism of the parent application and the complete structure will be described herein substantially as it is described in the parent application.

Figure 4:
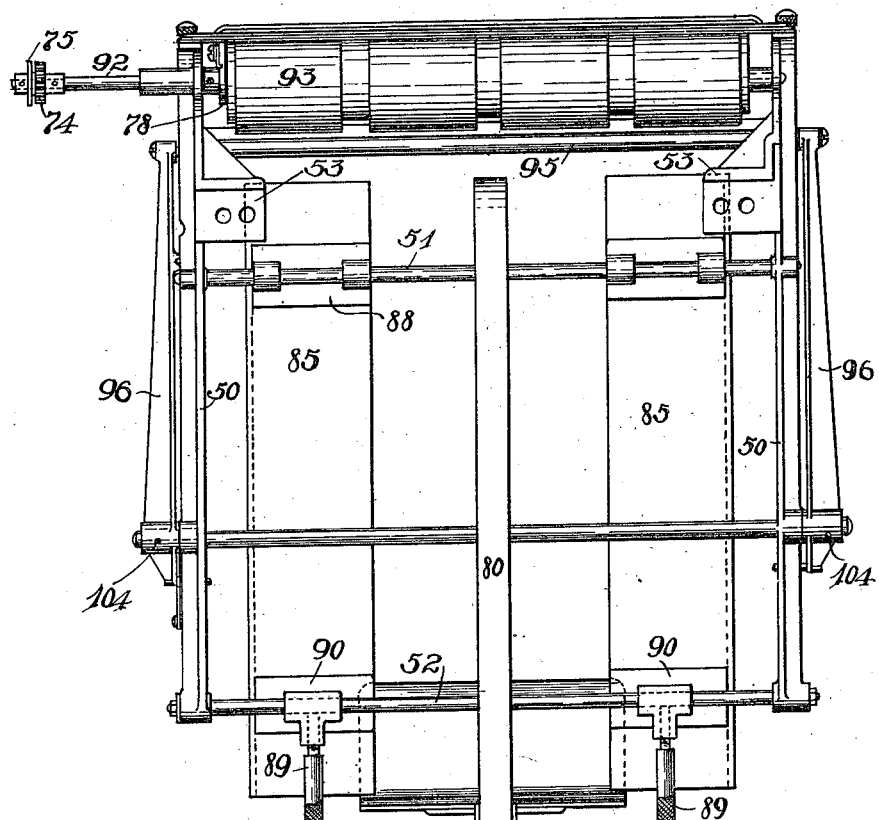
Figure 5:
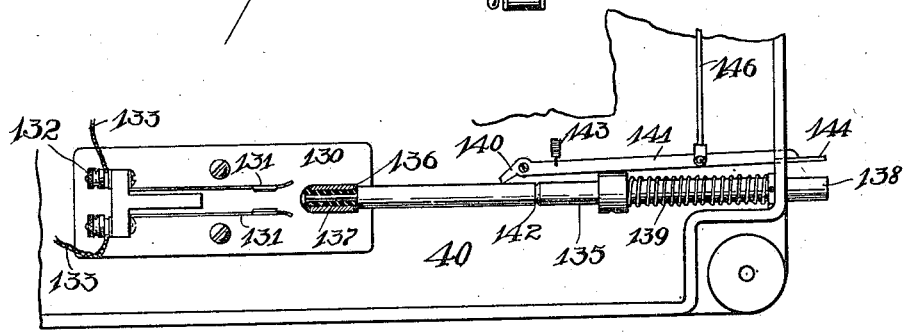

In the drawings, Figure 1 is a side elevation of my mechanism showing also a portion of a multigraph with which the same coöperates. Fig. 2 is an enlarged section in a plane parallel with Fig. 1 of the feed roller and sheet separating and guiding device; Fig. 3 is a front elevation of the mechanism shown in Fig. 1; Fig. 4 is a rear elevation of the paper feeding mechanism detached; Fig. 5 is a portion of the bottom plan of the bed plate showing the automatic switch; Fig. 6 is a vertical section through the bed plate showing the motor drive; Fig. 7 is a transverse section at right angles to Fig. 6, as indicated by the line 7—7 of Fig. 6; Figs. 8 and 9 are respectively an end view and a section of the movable pinion on the end of the motor shaft; Fig. 10 is a bottom perspective of the bed plate for the motor drive; Fig. 11 is a detail of the attachment for the spring which supplies the pressure on the sheets of paper; Fig. 12 is a perspective of the link which drives the main feed roller; Fig. 13 is a detail showing the bearing of the paper pressing arms, being a section on the line 13—13 of Fig. 3; Fig. 14 is an axial section of the main feed roller; Fig. 15 is a cross section through the feed roller shaft showing the ratchet mechanism; Fig. 16 is a detail of the clamp for the paper support, as indicated by the line 16—16 of Fig. 3.

In the upper part of Figs. 1 and 3 is shown a portion of a multigraph comprising a rotary type carrying drum 20, mounted between end plates 21 and 22. On this drum is a gear 23 which meshes with a gear 24 on a platen coöperating with the drum. These gears are indicated by broken lines in Fig. 1, where the shaft of the platen is also shown at 25. Fig. 3 shows a portion of the gear 23 in side elevation, and Fig. 6 shows the gear 24 in side elevation, as well as the platen 26 in dotted lines. In front of the platen of the standard multigraph are feed rollers 29 and 30, the former of which is connected by a gear 31 with a platen gear 24. These are shown in dotted lines in Fig. 1, as is also the feed table 32, the guard 35 and the stopping fingers 33. The parts so far described are of a well known construction and may be considered, for example, as made in accordance with my prior Patent No. 846,992.

The multigraph shown is provided at the lower ends of its end plates with feet 34 which have vertical openings through them. A usual stand for the multigraph is made of four upright tubes 36 connected by cross tubes 37 and 38. The upper ends of these tubes 36 carry flanged guides which are adapted to embrace the feet 34, holding the multigraph in place. I mount the motor and its gearing on a horizontal bed plate 40, which has corner ears 41 adapted to occupy the guides 39 on the upper ends of the tubes 36. Accordingly, to mount this portion of the machine it is only necessary to lift off the multigraph from its stand, put the bed plate in place, and put the multigraph on top of the bed plate, and clamp it thereto by screws 42 screwing into the ears 41. The motor drive mechanism, which is hereinafter more fully explained, has a gear 60 meshing with the platen gear 24, and it is connected with the paper feed roller, hereinafter described, by a removable link 70.

The mechanism which supports the paper is mounted in a removable self contained structure shown in Fig. 4. The frame of this structure consists of two upright bars 50 and connecting cross rods 51 and 52. The upright bars have laterally extending lips or brackets 53 which are adapted to be screwed onto the front edge of the bed plate 40, as indicated by the screws 54 in Fig. 3.

From the above description, it will be seen that the mechanism requires no change whatever in the multigraph itself, and has no parts fastened to the multigraph, but it is simply necessary to place the multigraph on the stand, its platen gear then meshing with the gear 60 of the motor drive. To remove the motor drive and paper feed mechanism, the multigraph is simply lifted off and the bed plate 40 with the various parts carried thereby lifted off the stand and the multigraph returned to the stand. To detach the paper feed portion from the motor drive portion, it is only necessary to disconnect the link 70 and to take out the screws 54. This ready adaptation and detachability is one of the features of my invention.

Reverting now to the motor drive portion, there will be seen secured to the under side of the bed plate 40 a motor 61, the armature shaft 59 of which is provided with a pinion 62 which meshes with a gear 63 on a shaft 64 mounted in lugs 43 on the under side of the bed plate. Near the other end of this shaft 64 is a pinion 65 meshing with the gear 60, which in turn is adapted to mesh with the platen gear 24. This gear 60 is on a shaft 66 upon which is a pinion 67 meshing with a gear 68 on the shaft 69. On the end of this shaft is a crank 71 which operates the link 70 to drive the paper feed, as hereinafter explained.

To vary the speed of the operation, I make the gears 62 and 63 easily removable and replaceable by gears of other sizes. The means for securing each of these gears to their shafts is the same, and is illustrated in Figs. 8 and 9. There 59 indicates the shaft, on a reduced portion of which is loosely mounted the pinion 62. This pinion is provided with a pair of studs 58 which are adapted to occupy holes in a washer 57 which has a non-circular central opening fitting over a flattened portion on the end of the shaft 59. A cap screw 56 holds the washer and pinion in place. The simple removal of this cap screw and washer allows the removal of the gear so that other gears may be conveniently substituted.

The paper feed portion of the mechanism which constitutes the subject matter of this application is best shown in Figs. 1 to 4. As heretofore explained, it has a frame comprising vertical side bars 50 secured to the bed plate 40 and connected and braced by cross rods 51 or 52. Carried by these cross rods is a vertical central bar 80 which has an under cut front edge on which is slidably mounted a bottom support 81 for the paper. This support is adapted to be adjusted up and down the bar 80 and locked in position by the clamping screw 82 which binds depending arms 83 of the support on the bar 80 as shown in Figs. 3 and 16. This bottom support is preferably of sheet metal and extends approximately horizontally and then turns upwardly, as shown. Edge guides for the paper are provided by the two plates 85 which have forwardly projecting edge flanges 86 and are slidably mounted on the cross rods 51 and 52 by means of eye plates 88 and 90, on the back side of the plates 85. The edge guides are clamped in adjusted position by set screws 89 screwing into the eyes of the lower eye-plates 90.

By the above means there is provided a holder for the block of paper extending vertically, the foremost sheet resting against the plates 85, the edges being guided by the flanges 86 and the bottom and outer side being supported by the support 81.

Mounted in the side frames 50 above the upper edges of the plates 85 is a shaft 92 on which is mounted the main feed roller 93 which may consist of a number of short rubber sections, as shown in Fig. 4. On its outer side this feed roller alines with or extends slightly beyond the plane of the plates 85 so that the block of paper carried in the holder may rest near the upper end of the forward sheet against the roller 93. The paper is pressed against the roller 93 by the roller 95 mounted in the two arms 96 which have bell crank extensions 97, as shown in Fig. 1, to which are attached tension springs 98 which are adjusted by the screws 99 having knurled heads 100 and mounted in the frame and screwing into nuts 101 to which the springs are attached.

The result of the described construction is that the roller 95 is caused to bear with the desired pressure against the paper and hold it against the roller 93. In order to insure proper pressure at both edges of the paper it is desirable that the roller 95 have independent springs for its two ends, as shown. It is also desirable that the roller with its two arms may be adapted to be swung back as a unit for placing the paper and may not be caused to be sprung or twisted by one arm swinging back without the other. Accordingly, I mount the two arms 96 on a cross rod 103 which is loosely journaled in the frame members 50. The arms, however, are not absolutely rigid on this cross rod, but have a slight play, as indicated in Fig. 13, where it will be seen that the connection between the arm and the cross rod is made by pin 104 rigid in the cross rod but occupying enlarged openings in the arm. The above described connection allows enough independence of play of the two arms 96 to cause the pressure to be even, while the independence is so limited that the swinging back of one of the arms will necessarily turn back the other and the roller. To hold the arms and the roller in their retracted position, to allow the installation of the paper, I provide a catch 105, which is adapted to hook over the pin on one of the short arms 97 to which the spring 98 is attached. This is best shown in Fig. 1.

It will be understood from the above description that the paper to be fed stands in a vertical plane held lightly near its upper end between the rollers 95 and 93. This is shown in Fig. 2 where the lines 110 illustrate the paper. Accordingly, if the roller 93 be rotated with its outer side upwardly, the tendency will be to feed the nearest sheet upwardly. To limit the feed to one sheet at a time, and to guide the sheet so that it is changed from an upward feed to a horizontal feed so as to pass into the multigraph, I provide a peculiarly shaped bar, the form of which has been demonstrated by actual practice to be very effective.

The deflecting bar is shown in Fig. 2, and designated 111. Its under surface forms a stop for those sheets of paper standing some distance back from the roller 93. Accordingly, the outermost portion of the under surface of this bar shown at 112 is substantially parallel with the bottom portion of the support 81. In front of this the bar inclines upwardly, as shown at 113, and then has a downward rib 114, the surface of which joins by a more or less abrupt curve with the surface 113. In front of the point of this rib the bar inclines upwardly more abruptly, as shown at 115. Now, with such a deflecting or separating bar the sheet, as fed upwardly by the roller 93, first engages the bar, and then upon the continuation of the feeding buckles at its upper edge until such edge is curved more or less nearly horizontally when it passes beneath the rib 114 and moves toward the multigraph horizontally beneath the guide 120. 121 represents an under guide on which this sheet may rest, this guide being curved upwardly near its extreme end, as shown at 122, to bend the sheet of paper upwardly so that it is buckled as it strikes the regular guide plate 35 of the multigraph, and thus passes downward against the fingers 33 buckling more or less according to the time those fingers hold it, and advancing into the multigraph under the influence of the rollers 29 and 30, as explained in the patent referred to. The under guide 121 continues outwardly in the form of strips 123 which are of quadrant shape and occupy recesses between the spools 93, these strips joining into a transversely extending vertical strip 124, which stands above the plates 85.

The principle of the separation of the sheets so that but one at a time is fed is that the rib 114 introduces enough resistance to the movement of the paper so that it is easier for each front sheet to slip on the adjoining one than to carry such adjoining one with it, while the resistance is not great enough to hold back the sheet which is actually engaged by the roller 93. The result is that several sheets may be fed upward slightly by the roller 93, but that only the forward sheet is caused to buckle and escape from the guiding rib 114. This is a very important point, as the separation of the sheets and insurance of the feeding of but one at a time has been one of the causes of automatic feeds being ineffective. The present feed has been thoroughly demonstrated and found to be very effective.

In the above description of the operation, it has been assumed that the main feed roller 93 is rotated only in the right hand direction. This rotation, however, in this direction should be intermittent to allow time for printing each sheet after it is fed. This I accomplish by the link 70, heretofore referred to, which is connected at its inner end with the crank 71, and at its outer end has a slot 72 extending around a shoulder 73 (Fig. 14) on the pinion 74 which is on the shaft 92 of the main feed roller. The link is held in place on the pinion by the collar 75 on the shaft. The link carries a rack 76 (Figs. 3 and 12) which engages with the teeth of the pinion 74. The feed roller 93 is loose on the shaft 92, but carries a pawl 77 which is adapted to engage a ratchet 78 pinned to the shaft. Accordingly, when the rack 76 drives the pinion and shaft in one direction, the ratchet engaging the pawl drives the feed roller, while for the returning stroke of the link, the ratchet clicks idly beneath the pawl.

The amount of the rotation of the feed roller 93 is varied by adjusting the amount of throw of the link, which I accomplish by making a variable connection between the link and the crank 71. Accordingly, as shown in Fig. 1, the crank is slotted and the link is connected thereto by a pin 79 which is clamped at any desired point in the slot. Moreover, the crank may be clamped on the shaft 69 in any desired position by reason of the set screw 71$^a$ screwing into the hub of the crank. Thus, not only may the amount of each movement of the feed roller be adjusted, but the time when it begins its movement may be regulated with reference to the regular feed of the multigraph.

It is to be understood that the cam on the multigraph which controls the fingers 33 is adjusted according to the matter on the printing drum, and according to the letter head on the paper, as explained in the patent referred to, and then the crank 71 is adjusted so that the paper will be fed by my automatic mechanism against the fingers 33 just in advance of the time when these fingers are swung downward to release the paper to the action of the feed rollers 29 and 30.

It will be seen from the above description that the printing operation is entirely automatic. When the motor is started, the drum rotates and the paper is fed thereto one sheet for each rotation. To stop the operation of the machine when the paper runs out, I provide an automatic switch for the motor controlled by the follower frame on the paper feeding mechanism. This automatic switch employs as a part of itself the regular switch for starting the motor. This is illustrated in Figs. 1 and 5.

Referring to Fig. 5, 130 illustrates a block of insulation secured to the under side of the bed 40. Carried by this are a pair of terminal springs 131 which are connected with binding posts 132 from which lines 133 lead to the motor. Slidably mounted on the under side of the bed is a rod 135 which carries near its inner end an insulating sleeve 136 around which is a metallic sleeve 137. Now when this rod is pushed inwardly, the metallic sleeve engages with each of the springs 131 and electrically connects them, starting the motor. The inward movement of the rod 135 may be accomplished by the operator pushing with his finger on the projecting end 138 of the rod which extends out at the left hand end of the machine. A suitable spring 139 tends to hold the rod in position with the switch open. When however, the rod has been pushed inwardly sufficiently to close the switch the nose 140 of a pivoted lever 141 engages in a notch 142 in the rod under the influence of a spring 143 and holds it in its innermost position. The lever 141 projects outwardly beyond the base and has a finger portion 144 by which it may be pushed toward the finger piece 138, releasing the rod and stopping the motor. This provides for the manual starting and stopping of the motor. Connected with the lever 141 is a link 146 which extends forwardly and projects out at the front end of the base plate, as shown at 147, (Fig. 1), directly behind a screw 148 adjustably carried in the left hand arm 96 of the follower frame. This screw is so adjusted that when the paper has been all used except a few sheets, the screw will have pressed the rod 146 sufficiently to cause the nose 140 of the lever to release the rod 135, which springs outwardly under the influence of its spring 139, thereby breaking the circuit and stopping the motor.

From the above description, it will be seen that my mechanism, while being extremely simple in construction, is absolutely automatic in operation, driving the multigraph and feeding the paper and stopping itself when the paper becomes exhausted. Furthermore, that it is very easy to supply a new block of paper and to restart the motor. The adjustments for different sizes of sheets of paper, as well as for different stiffness and thickness of paper (by variable pressure of the follower), are very easily and readily made. The power drive and paper feed is removable as a whole, or separately, as desired, and it in no manner interferes with the ordinary multigraph. No change in the multigraph is necessary, as the exposed under portion of the platen gear is availed of for the connection of the power drive.

The usual crank drive of the multigraph may be employed with the identical mechanism shown, if desired, the switch to the motor being simply kept open or the motor being entirely disconnected at the gears 62 and 63. The change in these gears, as already mentioned, changes the speed of operation according to the requirements. By removing one of these gears, or dispensing with the motor, we may have a hand driven machine with an automatic paper feed which is an advantage over the hand feed.

I claim:—

1. The combination of a frame consisting of uprights and cross rods, a front support for the paper comprising upright strips adjustably mounted on said cross rods and having flanges forming edge guides for the paper, an adjustable member for supporting the paper at the bottom, a spring pressed follower frame, a feed roller against which the same may press the paper, and a deflecting lip standing in the path of the fed sheets and serving to retard all except the foremost.

2. The combination, with horizontal cross rods, of upright flanged plates provided on their rear sides with eyes embracing the rods and adjustable laterally on said rods, a feeding roller whose outer surface is substantially tangent to the outer surface of said plates, a spring-pressed follower frame adapted to press a block of paper against said roller, a deflector and a retarding edge in the path of paper fed by said roller.

3. The combination of a main feed roller, means for supporting the paper in an upright block with the upper portion bearing against the roller, means causing such bearing, and a deflecting bar located above the paper and having a portion forming a stop for the block of paper, and in front of this, an upwardly inclined portion, and in front of this a small downwardly projecting rib with an upwardly inclined portion in front of it.

4. The combination, with a means for supporting the paper in an upright form, of a main feed roller against which the paper may bear, means for causing pressure toward the feed roller, means for deflecting the paper, the feed roller being divided into sections, a guard formed in strips and bent through substantially a quadrant and occupying the space between such sections, and a retarder for the paper standing opposite such guard and engaging all the sheets fed and holding back all but the foremost.

5. The combination with a printing mechanism having a paper feeding device and a feed table and a downwardly inclining guard in front of the paper feeding device, of an automatic preliminary feed comprising means for supporting the paper in a substantially upright form, a roller and a deflector formed to bend the paper from the upright into a substantially horizontal course, and an upwardly turned deflector on the under side of the paper adapted to bend its edge upwardly to cause it to strike the downwardly inclined guard of the printing mechanism.

6. In a paper feeding device, the combination of a feed roller, a pressure frame comprising a roller and pivoted arms carrying it, an adjustable spring acting thereon to press the paper against the feed roller, and a latch coöperating with one of said arms for holding the pressure frame in inactive position.

7. In a paper feeding device, the combination of a frame, a main feed roller carried thereby, a pair of hinged arms carried thereby, a pressure roller carried by said arms, said arms being provided with bell crank extensions and adjustable tension springs acting on said extensions, and a latching hook adapted to engage one of said extensions to hold the pressure roller away from the main feed roller.

8. The combination, with a feed roller, of a pressure frame composed of a roller and two pivoted arms supporting the same, a movable rod on which said arms are mounted with a limited independent play, and springs acting independently on said arms.

In testimony whereof, I hereunto affix my signature in the presence of two witnesses.

HARRY C. GAMMETER.

Witnesses:
ALBERT H. BATES,
BRENNAN B. WEST.

Copies of this patent may be obtained for five cents each, by addressing the "Commissioner of Patents, Washington, D. C."